US007558570B2

(12) United States Patent
Jung et al.

(10) Patent No.: US 7,558,570 B2
(45) Date of Patent: Jul. 7, 2009

(54) TERRESTRIAL DMB RECEIVER USING IMAGINARY CHANNEL TO RECEIVE BROADCASTING SERVICES

(75) Inventors: Ji-Wuck Jung, Suwon-si (KR); Byoung-Dai Lee, Seongnam-si (KR); Tae-Soo Lee, Seoul (KR); Chang-Sup Shim, Seoul (KR); Yun-Je Oh, Yongin-si (KR); Young-Jip Kim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 594 days.

(21) Appl. No.: 11/374,796

(22) Filed: Mar. 14, 2006

(65) Prior Publication Data

US 2007/0011701 A1 Jan. 11, 2007

(30) Foreign Application Priority Data

Jul. 6, 2005 (KR) ..................... 10-2005-0060802

(51) Int. Cl.
*H04N 5/445* (2006.01)

(52) U.S. Cl. ...................................... 455/428; 375/147

(58) Field of Classification Search ................. 455/204, 455/226.1, 296, 428, 480, 522; 370/318, 370/320, 210; 375/147, 148, 242, 260, 295, 375/346

See application file for complete search history.

(56) References Cited

U.S. PATENT DOCUMENTS

2003/0074448 A1* 4/2003 Kinebuchi et al. .......... 709/225
2005/0186933 A1* 8/2005 Trans ......................... 455/296

* cited by examiner

*Primary Examiner*—Sam Bhattacharya
(74) *Attorney, Agent, or Firm*—Cha & Reiter, LLC

(57) ABSTRACT

A terrestrial DMB receiver using an imaginary channel in a terrestrial DMB system is disclosed. The terrestrial DMB receiver includes: a key input unit for receiving an input from a user; a display unit for providing image output to the user; an imaginary channel storage unit for storing information on imaginary channels designated to each broadcasting service by the user; a DMB receiving unit for receiving terrestrial DMB broadcasting; a MCI/SI analyzer for analyzing MCI and SI of FIC information from a DMB broadcasting signal received through the DMB receiving unit; and a controller for searching for the imaginary channel storage unit according to values of number keys input from the key input unit, extracting service IDs, controlling the DMB receiving unit to select broadcasting services according to the extracted service IDs, checking the information analyzed through the MCI/SI analyzer, and performing an update for the imaginary channel storage unit.

14 Claims, 9 Drawing Sheets

TERRESTRIAL DMB RECEIVER USING IMAGINARY CHANNEL TO RECEIVE BROADCASTING SERVICES

CLAIM OF PRIORITY

This application claims priority to an application entitled "Terrestrial DMB Receiver Using Imaginary Channel, Imaginary Channel Update Method and Broadcasting Service Selection Method," filed in the Korean Intellectual Property Office on Jul. 6, 2005 and assigned Serial No. 2005-60802, the contents of which are hereby incorporated by reference.

BACKGROUND OF THE INVENTION

1. Field of the Invention

The present invention relates to a terrestrial Digital Multimedia Broadcasting (DMB) system. More particularly, the present invention relates to a terrestrial DMB receiver using an imaginary channel, in which a user defines an imaginary channel, maps a broadcasting service actually received through the imaginary channel, thereby receiving the same broadcasting service by means of the mapped broadcasting service even when a broadcasting service is provided through a different frequency due to inter-area movement.

2. Description of the Related Art

A terrestrial DMB relates to a system standard, which was introduced first in Korea, to provide a multimedia broadcasting service including video on the basis of Digital Audio Broadcasting (DAB) Eureka-147 system. DAB is a digital radio broadcasting standard used in Europe which provides both a high quality audio service of CD quality and a data service simultaneously.

When compared to the general digital broadcasting, such as Advanced Television Systems Committee (ATSC) and Digital Video Broadcasting (DVB), the terrestrial DMB is advantageous in that a user can watch broadcasting programs while moving. That is, if a DMB user has a DMB receiver terminal, the user can watch the broadcasting at any time when moved one place to another remote place.

Terrestrial DMB has another advantage in that a broadcasting service is not limited only to a video service, but offers an audio service and a data service. Accordingly, it is possible to provide more channels and services through the terrestrial DMB, as compared with the stationary terrestrial digital broadcasting scheme. A terrestrial DMB signal is formed by an ensemble, which includes multiple services. One ensemble corresponds to a basic element constituting a terrestrial DMB signal, and a user can receive a specific service by selecting a service in the ensemble. Hence, one ensemble may include multiple video services, audio services and data services.

FIG. 1 is a diagram illustrating the structure of an ensemble used in a terrestrial DMB system.

Referring to FIG. 1, the ensemble used in the terrestrial DMB system includes a plurality of services and service components constituting each service. The ensemble has a structure conforming to a DAB standard proposed by an existing Eureka-147. As illustrated in FIG. 1, the ensemble 101 with a label "DAB ENSEMBLE ONE" includes services "ALPHA 1 RADIO" 102, "BETA RADIO" 103 and "ALPHA 2 RADIO" 104. The service "ALPHA 1 RADIO" 102 includes the service components 105 to 107, the service "BETA RADIO" 103 includes the service components 108 and 109, and the service "ALPHA 2 RADIO" 104 includes the service components 106, 107, 109 and 110.

The service in the ensemble is included in a portion of one ensemble frame of Main Service Channels (MSCs) 114 to 118, and configuration information of such an MSC may be understood through Multiplex Configuration Information (MCI) 111 and Service Information (SI) 112, which are received through a Fast Information Channel (FIC).

If a receiver terminal actually selects and tunes a specific ensemble, the service included in the MSC of the ensemble is not directly extracted and displayed. That is, the MCI 111 and the SI 112 of the FIC is first analyzed, then the services of the MSC are displayed.

Hereinafter, the terrestrial DMB system used in Korea will be described. The number of ensembles assigned to the terrestrial DMB is six, and each ensemble includes multiple services.

Tables 1a and 1b show simple information on ensembles assigned to the terrestrial DMB and service information. As shown in tables 1a and 1b, the terrestrial DMB includes 7 video channels, 13 audio channels and 7 data channels.

TABLE 1a

| Corporation Name | Channel Organization Plan (channel name-broadcasting type-transmission capacity) | Use Method | Broadcasting Field |
|---|---|---|---|
| KBS | KBS-Mobile 1-TV-548k | Direct use | Synthetic Organization |
| | KBS-Mobile 3-Radio-128k | Direct use | Music-only |
| | KMMB-R-Radio-128k | Lease (KMMB) | Life economy-only |
| | OZIC-Radio-128k | Lease (CJ media) | Music-only |
| | KBS-Mobile 5-Data-220k | Direct use | Synthetic Organization |
| MBC | MBC DMB TV-TV-548k | Direct use | Synthetic Organization |
| | MBC DMB Radio-Radio-128k | Direct use | Synthetic Organization |
| | MBC Economy Radio-Radio-128k | Lease (MBN) | Economy-only |
| | Arirang English Radio-Radio-128k | Lease (Korea International Broadcasting Foundation) | Korean culture-only |
| | MBC DMB Data-Data-220k | Direct use | Synthetic Organization |
| SBS | SBS DMB TV-TV-544k | Direct use | Synthetic Organization |
| | SBS DMB Radio-Radio-128k | Direct use | Synthetic Organization |
| | TBS DMB Radio-Radio-128k | Lease (TBS-Seoul City) | Traffic-only |
| | Kyunggi Broadcasting DMB Radio-Radio- 128k | Lease (Kyunggi Broadcasting) | Culture and art-only |
| | Hankyoreh DMB Data-Data-96k | Lease (Hankyoreh) | Job education-only |
| | LGT DMB Data-Data-96k | Lease (LGT) | Leisure and entertainment-only |
| | SBS DMB Data-Data-32k | Direct use | New technology and new service development/experiment (Synthetic Organization) |

TABLE 1b

| Corporation Name | Channel Organization Plan | Use Method | Broadcasting Field |
|---|---|---|---|
| YTN DMB (tentative name) | YTN plus-TV-512k | Direct use | Synthetic Organization |
| | TBN Korea Traffic Broadcasting Network-Radio-160k | Lease (Road Traffic Safety Authority) | Traffic-only |
| | Satio+-Ratio-160k | Lease (Satio) | Music |
| | YTN premium-data-320k | Direct use | Synthetic Organization |
| Korea DMB (tentative name) | Korea DMB TV-TV-548k | Direct use | Synthetic Organization |
| | i4U-Radio-128k | Lease (Christian broadcasting) | Life culture |
| | Live4U-Radio-128k | Lease (Music city media) | Public performance music/culture-only |
| | Korea DMB data-data-348k | Direct use | Synthetic Organization |
| KMMB (tentative name) | KMMB-TV-512k | Direct use | Synthetic Organization |
| | KBS Mobile 2-TV-512k | Lease (KBS) | Family culture-only |
| | KMMB data-data-128k | Direct use | Synthetic Organization |

The terrestrial DMB, as described above, has a disadvantage in that it is not possible to maintain the ensemble frequencies of all areas due to inter-channel interference. In the case of satellite DMB, one broadcasting service is provided through an equal frequency domain on a national scale. However, in the case of terrestrial DMB, broadcasting services have different frequencies according to areas. That is, even when a terrestrial DMB broadcasting signal with an index of "ensemble 1" is received in an area "A" through a frequency "a", the terrestrial DMB signal with the index of "ensemble 1" may not be received in an area "B" through the same frequency "a". As a frequency differs depending on the area, a terrestrial DMB receiver terminal must find information on each ensemble through an ensemble scanning.

Further, when terrestrial DMB broadcasting is received through a terrestrial DMB receiver terminal, a service category is first determined and broadcasting is selected through channel information within a corresponding service category. When broadcasting is received through a terrestrial DMB receiver terminal as described above, a selection process of broadcasting is complicated and broadcasting is not immediately selected by a user.

FIG. 2 is a diagram illustrating a process by which an existing terrestrial DMB receiver terminal selects broadcasting.

As illustrated in FIG. 2*a*, a user determines a service category of desired broadcasting. Such a service category may be classified into "1. video channel", "2. audio channel", "3. data channel", etc. As illustrated in FIG. 2*b*, a user searches for the desired broadcasting through a service list within the determined service category. If the user determines the desired broadcasting, the corresponding broadcasting is output as illustrated in FIG. 2*c*.

The reason for classifying each broadcasting service according to the service categories as described above is because a user cannot know the service category of broadcasting received through broadcasting channels due to the increase in the number of broadcasting channels provided from a terrestrial DMB system. Hence, it promotes the user convenience.

However, when a user searches for radio broadcasting, data broadcasting and video broadcasting, the user must repeat a search according to the service category and perform a movement of the service category as described above. Therefore, the user may feel inconvenienced.

FIG. 3 is a diagram illustrating the change of ensemble information due to inter-area movement in a general terrestrial DMB system.

Referring to FIG. 3, a service "MBC movie" is provided to an ensemble 1 of a first area 31 and a service "KBS radio" is provided to an ensemble 2 of the first area 31. A service "SBS drama" is provided to an ensemble 1 of a second area 32, and the service "MBC movie" is provided to an ensemble 2 of the second area 32. Further, the service "MBC movie" is provided to an ensemble 1 of a third area 33, and the service "SBS drama" is provided to an ensemble 2 of the third area 33.

Since ensembles are different according to areas, it is not easy for a DMB user with the mobility to select a desired service while moving between different areas. That is, with the change of the ensemble according to areas, it is not easy for the user to search for a service while moving between different areas.

As described above in FIG. 2, the DMB has many services. In selecting a specific service, most DMB users familiar with stationary broadcasting have become used to a scheme for selecting a service by directly pressing a number key mapped to the specific service. However, in a terrestrial DMB system, users cannot select a service by directly pressing a number key as in the case of the fixed broadcasting. The reason for this is as follows. In stationary broadcasting, number key information for service selection is associated with the number of a physical channel (i.e. frequency) receiving broadcasting signals. However, in terrestrial DMB, a physical channel is associated with an ensemble, and services of each broadcasting channel have a meaning as a logical channel within the ensemble. Therefore, it is not possible to match the physical channel with the number key, as in the case of stationary broadcasting.

As described above, as the conventional terrestrial DMB system does not match a service with a number key, it is impossible to use a channel selection method for selecting services by inputting a number key, as in the case of the conventional stationary broadcasting.

SUMMARY OF THE INVENTION

Accordingly, the present invention has been made to solve the above-mentioned problems occurring in the prior art and provides additional advantages, by providing a terrestrial DMB receiver using an imaginary channel, in which a user performs an imaginary channel mapping using fast channel information of terrestrial DMB, and can directly select a desired service by means of a previously mapped imaginary channel key while moving between different areas.

In accordance with one aspect of the present invention, a terrestrial Digital Multimedia Broadcasting (DMB) receiver using an imaginary channel in a terrestrial DMB system is provided. The terrestrial DMB receiver includes: a key input unit for receiving an input from a user; a display unit for providing an image output to the user; an imaginary channel storage unit for storing information on imaginary channels designated to each broadcasting service by the user; a DMB receiving unit for receiving terrestrial DMB broadcasting; a Multiplex Configuration Information (MCI) and Service Information (SI) analyzer for analyzing MCI and SI of Fast Information Channel (FIC) information from a DMB broadcasting signal received through the DMB receiving unit; and a controller for searching for the imaginary channel storage unit according to values of number keys input from the key input unit, extracting service IDs, controlling the DMB receiving unit to select broadcasting services according to the extracted service IDs, checking the information analyzed through the MCI/SI analyzer, and performing an update for the imaginary channel storage unit.

In accordance with another aspect of the present invention, there is provided a method for updating an imaginary channel according to inter-area movement in a terrestrial Digital Multimedia Broadcasting (DMB) receiver of a terrestrial DMB system, wherein the terrestrial DMB receiver receiving terrestrial DMB broadcasting. The method includes: a first step of retrieving by the terrestrial DMB receiver information on a broadcasting service of a current area; a second step of extracting a service ID for a predetermined imaginary channel from an imaginary channel list previously stored in the terrestrial DMB receiver; a third step of checking if the extracted service ID exists in a service ID list of a corresponding area among the information on the broadcasting service, which is retrieved in the first step; a fourth step of, when a service ID equal to the extracted service ID exists, maintaining a previously stored service ID; and a fifth step of, when the service ID equal to the extracted service ID does not exist, updating the imaginary channel list based on service linking information in the information of the broadcasting service.

In accordance with yet another aspect of the present invention, there is provided a method for selecting a broadcasting service according to inter-area movement of a terrestrial Digital Multimedia Broadcasting (DMB) receiver in a terrestrial DMB system in which an imaginary channel mapping is performed. The method includes: a first step of receiving an imaginary channel through a predetermined key in the terrestrial DMB receiver in which a mapping for imaginary channel is performed; a second step of extracting information on a broadcasting service corresponding to the predetermined key according to whether the predetermined key is included in an imaginary channel list stored in the terrestrial DMB receiver; and a third step of providing the broadcasting service according to whether a service of the extracted information on the broadcasting service is available.

BRIEF DESCRIPTION OF THE DRAWINGS

The above features and advantages of the present invention will be more apparent from the following detailed description taken in conjunction with the accompanying drawings, in which.

DETAILED DESCRIPTION

An embodiment of the present invention will be described in detail herein below with reference to the accompanying drawings. For the purposes of clarity and simplicity, a detailed description of known functions and configurations incorporated herein will be omitted as it may obscure the subject matter of the present invention.

Figure 1:
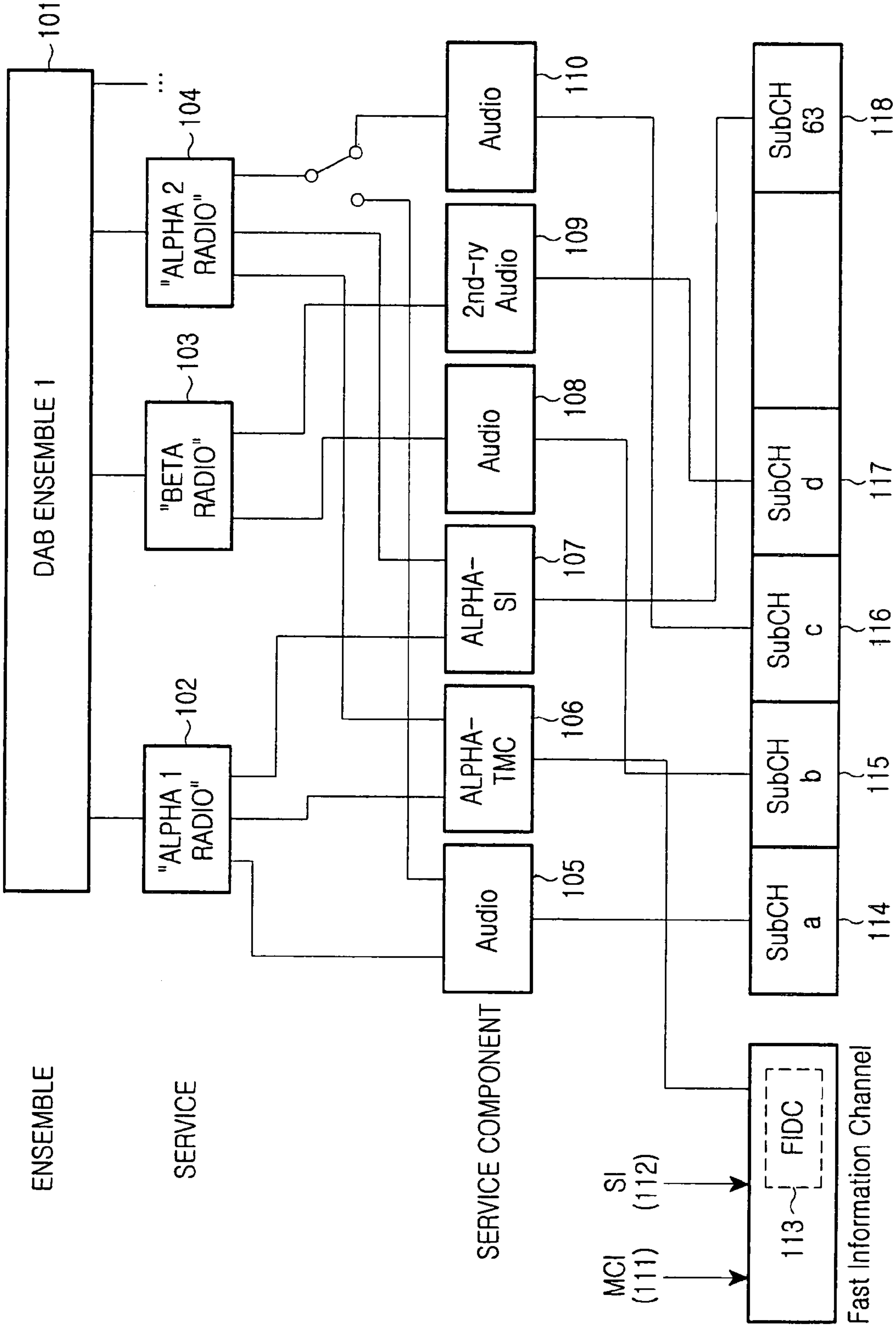
FIG. 1 is a diagram illustrating the structure of an ensemble used in a terrestrial DMB system.
Figure 2A:
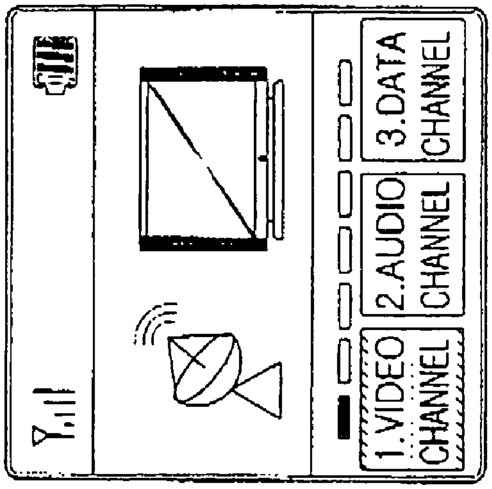
FIG. 2 is a diagram illustrating a process by which an existing terrestrial DMB receiver terminal selects broadcasting.
Figure 2B:
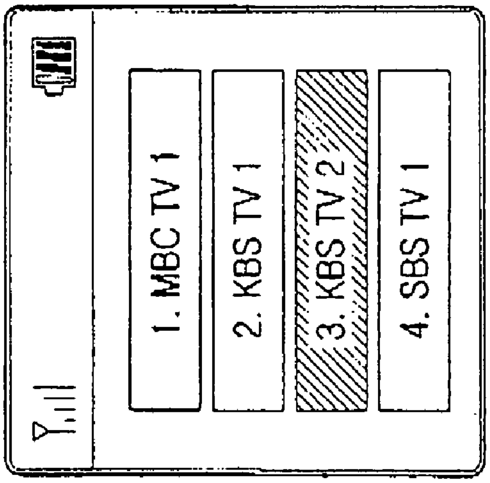
Figure 2C:
FIG.2C (PRIOR ART)
Figure 3:
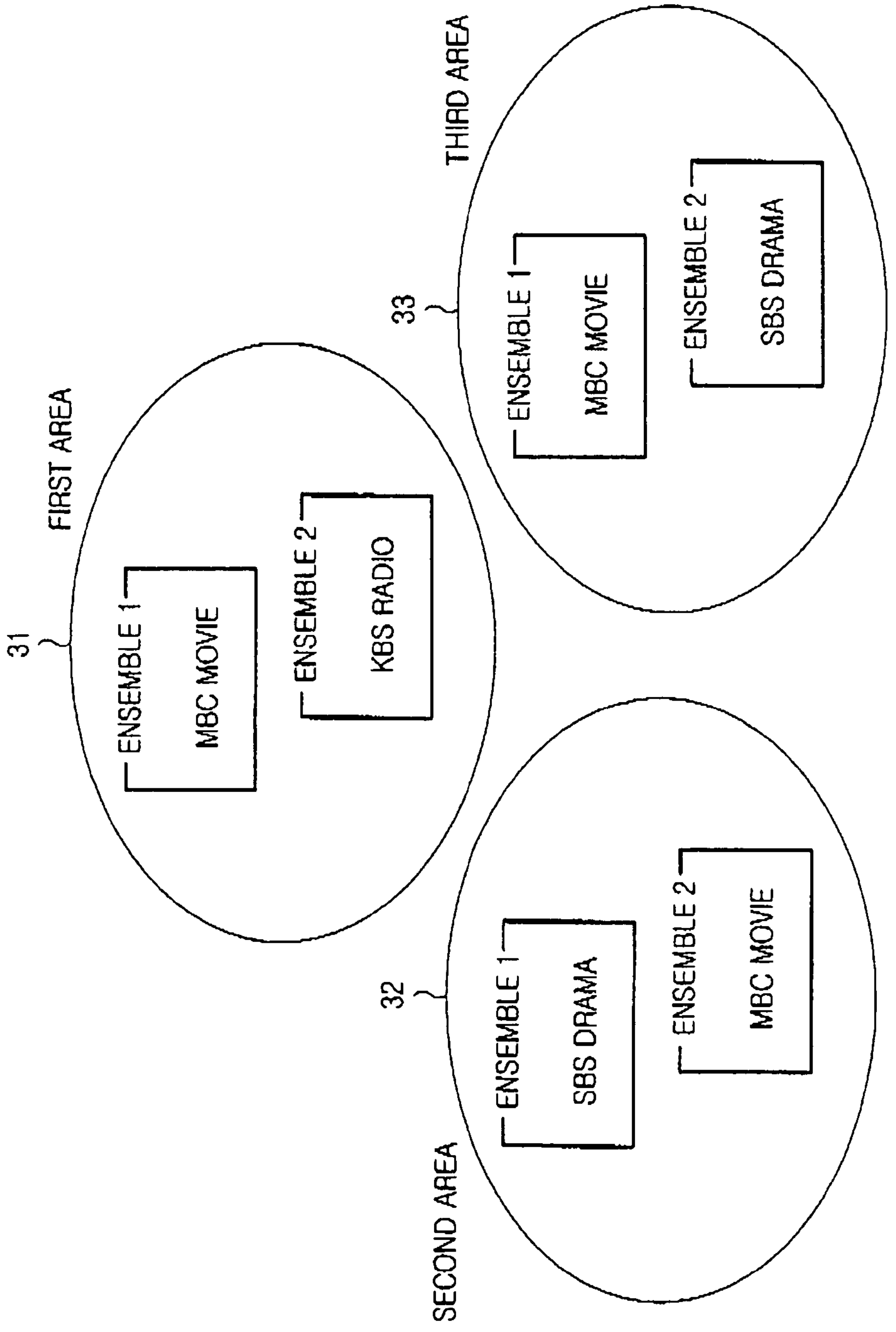
FIG.3 (PRIOR ART)
FIG. 3 is a diagram illustrating the change of ensemble information due to inter-area movement of a general terrestrial DMB system.
Figure 4:
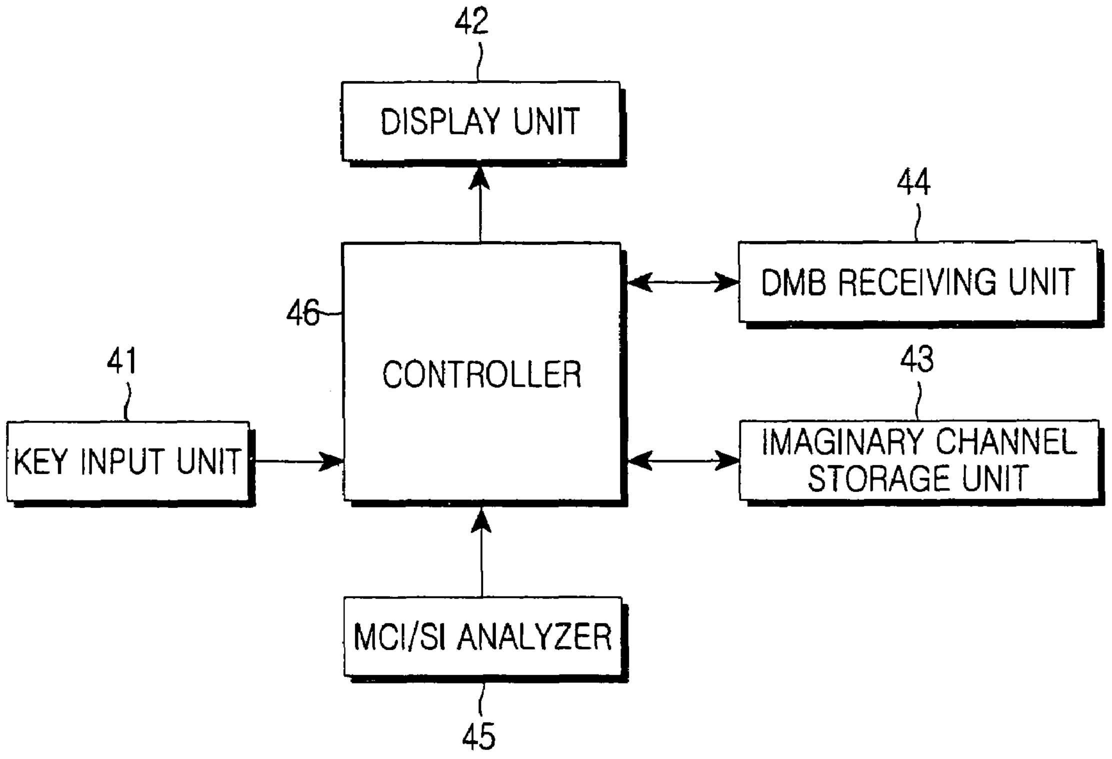
FIG. 4 is a block diagram illustrating the construction of an imaginary channel mapping apparatus in a terrestrial DMB receiver terminal according to an embodiment of the present invention.

FIG. 4 is a block diagram illustrating the construction of an imaginary channel mapping apparatus in a terrestrial DMB receiver terminal according to an embodiment of the present invention.

As illustrated in FIG. 4, the imaginary channel mapping apparatus includes a key input unit 41 for receiving inputs from a user, a display unit 42 for providing image outputs to a user, an imaginary channel storage unit 43 for storing information on an imaginary channel designated to each broadcasting service by a user, a DMB receiving unit 44 for receiving terrestrial DMB broadcasting, a Multiplex Configuration Information (MCI)/Service Information (SI) analyzer 45, and a controller 46. The MCI/SI analyzer 45 analyzes the MCI and SI of Fast Information Channel (FIC) information from a DMB signal. The controller 46 searches for the imaginary channel storage unit 43 according to values of number keys input from the key input unit 41, controls the DMB receiving unit 44 to select a broadcasting service according to the searched imaginary channel information, checks information analyzed through the MCI/SI analyzer 45, and updates the imaginary channel storage unit 43.

Hereinafter, each element will be described in more detail. First, the key input unit 41 receives an imaginary channel for selecting a broadcasting service desired by a user, or receives a key for setting an imaginary channel relating to a predetermined broadcasting service.

The display unit 42 outputs DMB broadcasting. Specifically, in the embodiment of the present invention, the display unit 42 outputs a menu screen for setting an imaginary channel or displays a corresponding imaginary channel when the imaginary channel is input.

The imaginary channel storage unit 43 is an element for storing both the service IDs of DMB broadcasting services and information on imaginary channels mapped to the services. Specifically, when an imaginary channel is mapped to a predetermined DMB service and an area movement occurs, corresponding imaginary channel information is updated through the linking information for finding out a service ID linked from the service ID of a corresponding area.

The DMB receiving unit 44 is an element for tuning into an ensemble for a predetermined broadcasting service under the control of the controller 46 and for receiving the predetermined broadcasting service from the corresponding ensemble.

When the terrestrial DMB receiver terminal moves between different areas and performs a channel search, the MCI/SI analyzer 45 analyzes the MCI and SI of the FIC information, extracts the service ID of a corresponding area and service linking information, and updates an imaginary channel list stored in the imaginary channel storage unit 43 through the service ID and the service linking information.

The controller 46 controls overall operation. Specifically, the controller 46 performs the setup operation of an imaginary channel, a channel selection operation through an input of an imaginary channel, and an update operation of an imaginary channel according to inter-area movement.

In the embodiment of the present invention, in order to use an imaginary channel, each broadcasting service of terrestrial DMB must have a unique identification number. This is because it is possible to map an imaginary channel to a corresponding identification number and to map an imaginary channel through associated information among identification numbers even when inter-area movement occurs.

Identification information on each broadcasting service of terrestrial DMB, which is used in the embodiment of the present invention, is referred to as "service ID". Such a service ID is included in the MCI of an FIC and transmitted. Specifically, the service ID is included in a frame (FIG 0/2) with an extension number 2 of a FIG type 0 within the MCI, and then transmitted. Such a service identification number is expressed by a binary of 16 bits or 32 bits.

In the terrestrial DMB system as described above, it is impossible to map an imaginary channel to a physical channel number as in the case of stationary broadcasting. Accordingly, in the embodiment of the present invention, an imaginary channel number is mapped to a service ID representing each broadcasting service, so that a user can select a service within an ensemble by means of a specific number key.

FIG. 5 is a diagram illustrating an imaginary channel mapping process according to an embodiment of the present invention.

Figure 5A:
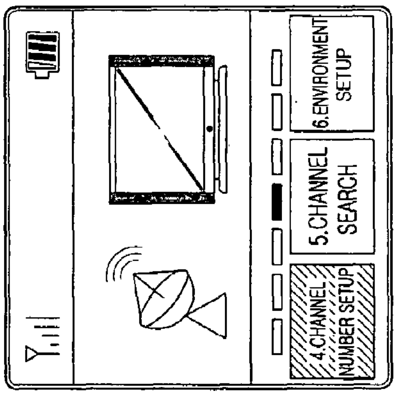
FIG. 5 is a diagram illustrating an imaginary channel mapping process according to an embodiment of the present invention.

FIG. 5*a* shows a menu item for an imaginary channel setup. A user can set an imaginary channel through a menu "channel number setup".

Figure 5B:
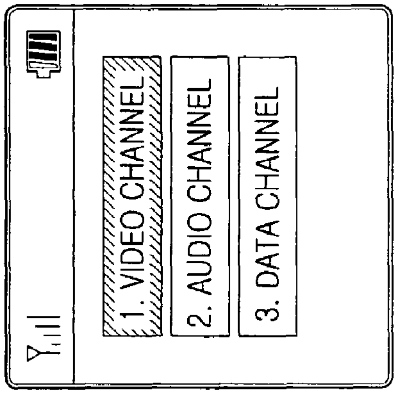
Figure 5C:
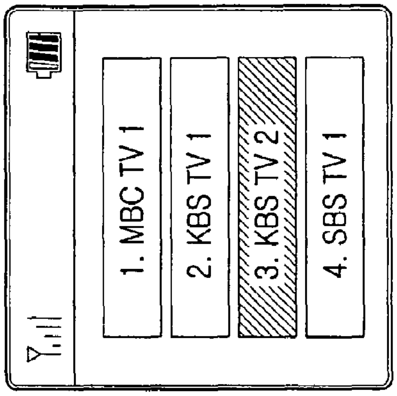

FIGS. 5*b* and 5*c* show a broadcasting service for which an imaginary channel is set through the channel number setup menu. In FIG. 5*b*, a user selects the service type of a broadcasting service to which an imaginary channel number is to be assigned. If a user selects the service type, a broadcasting service list corresponding to the selected service type is output as illustrated in FIG. 5*c*.

Figure 5D:
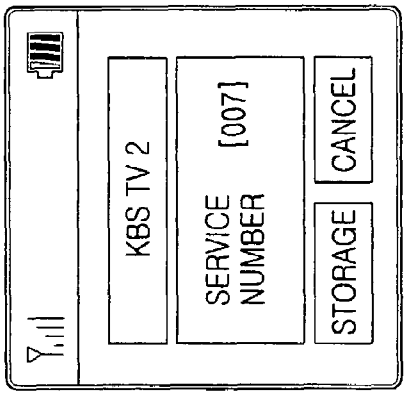

If a user selects one specific broadcasting service from the broadcasting service list, an imaginary channel assignment screen is provided, as illustrated in FIG. 5*d*. Accordingly, a user assigns a desired imaginary channel number through the imaginary channel assignment screen, thereby assigning a desired channel number to a desired broadcasting service. FIG. 5*d* shows an example in which a user assigns an imaginary channel number 7 to a video broadcasting service "KBS TV 2".

Figure 5E:
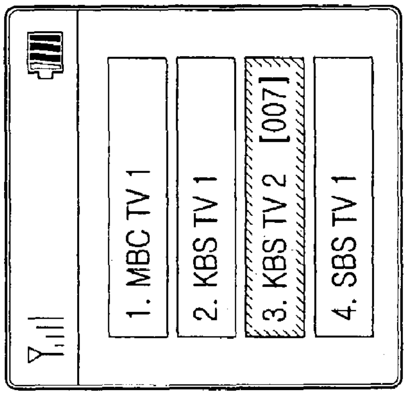

As illustrated in FIG. 5*e*, since imaginary channel information is displayed on the broadcasting service list, it can be understood that an imaginary channel has been set to a corresponding broadcasting service through the broadcasting service list.

TABLE 2

| Imaginary Channel Number | Service ID |
|---|---|
| 7 | 17 |
| 12 | 1231 |
| 21 | 1233 |
| 25 | 231 |

Table 2 shows an imaginary channel mapping table in which an imaginary channel number is mapped to a service ID.

Referring to Table 2, an imaginary channel number is set to "7" for a broadcasting service having a service ID of "17", and an imaginary channel number is set to "12" for a broadcasting service having a service ID of "1231".

The imaginary channel mapping table in which an imaginary channel number is mapped to a service ID, as described above, is stored in the imaginary channel storage unit 43. Accordingly, if an imaginary channel is input, a service ID is searched for from the imaginary channel mapping table according to the input imaginary channel, and the broadcasting service of a corresponding service ID is selected.

A service ID can be obtained by means of the MCI information as described above. Since each broadcasting is provided to a user by the service in a typical terrestrial DMB system, it is possible to select broadcasting services of terrestrial DMB by means of service IDs.

Figure 6:
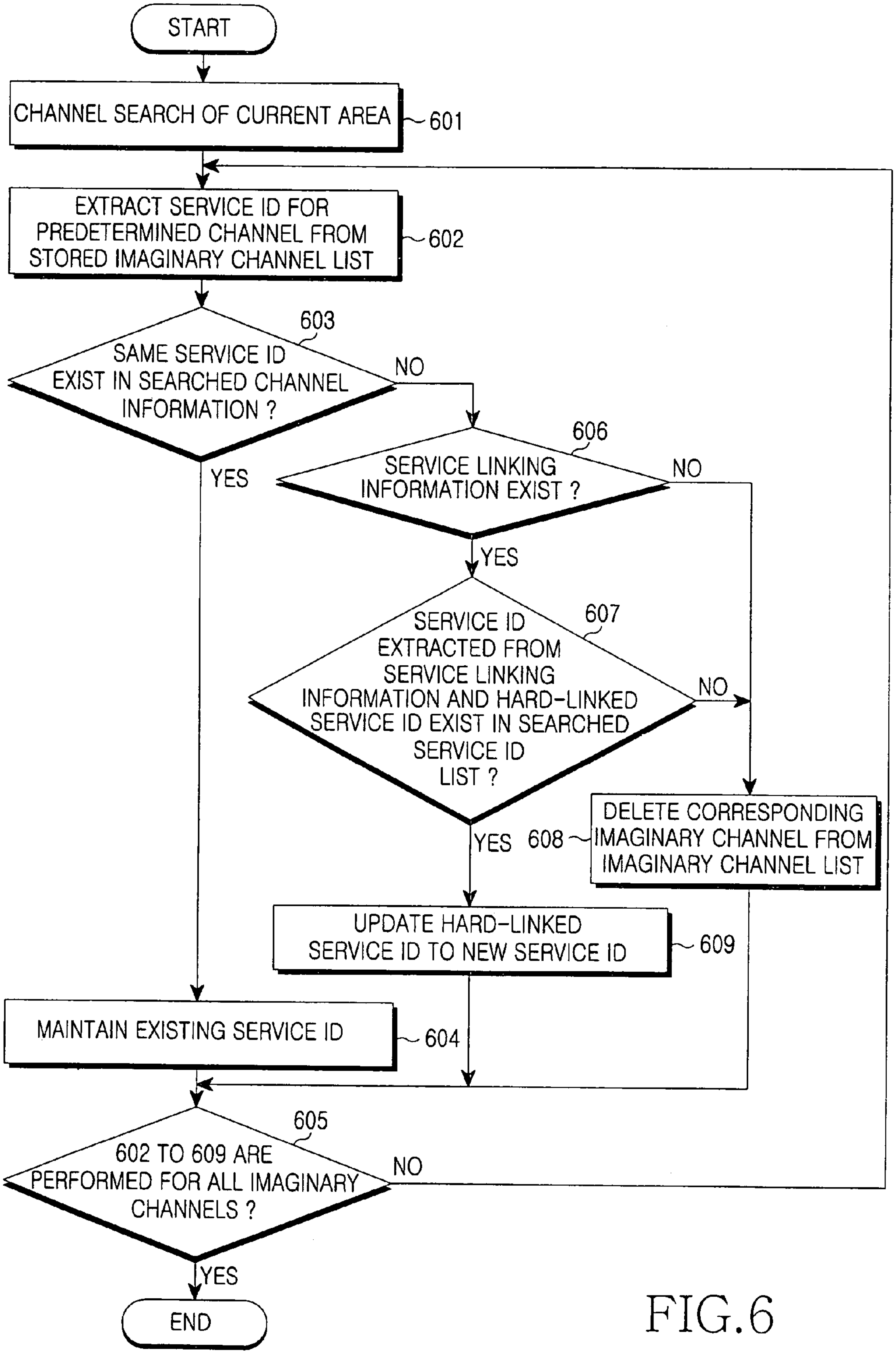
FIG. 6 is a flow diagram illustrating an imaginary channel list update method by a channel search necessitated due to inter-area movement in a terrestrial DMB system according to an embodiment of the present invention.

FIG. 6 is a flow diagram illustrating an imaginary channel list update method by a channel search necessitated due to an inter-area movement in a terrestrial DMB system according to an embodiment of the present invention.

The imaginary channel mapping table constructed as shown in Table 2 must be updated because the service IDs of each broadcasting service may be altered due to the inter-area movement of a terrestrial DMB receiver terminal. After the service IDs of each broadcasting service have been altered due to the above-described inter-area movement, etc., a channel search is performed and the altered service IDs are updated in the existing imaginary channel mapping table, so that an imaginary channel can be maintained with no change resulting from the inter-area movement.

Since the previously stored imaginary channel mapping table is not continuously supported due to the inter-area movement, etc., of a terrestrial DMB receiver terminal, it is generally necessary to update the imaginary channel mapping table. Hereinafter, an updating process for the imaginary channel mapping table will be described with reference to FIG. 6.

In order to perform an update operation for the imaginary channel mapping table, a terrestrial DMB receiver terminal searches for broadcasting services of an area in which the terrestrial DMB receiver terminal is currently located (601). The terrestrial DMB receiver terminal collects the MCI information and the SI information of FIC information through the broadcasting channel search process, thereby obtaining information necessary for updating the service ID of a corresponding area and the service linking information, etc.

Then, the terrestrial DMB receiver terminal extracts a service ID for a predetermined imaginary channel from the imaginary channel list (e.g. imaginary channel mapping table) previously stored therein (602).

The terrestrial DMB receiver terminal sequentially compares the extracted service ID with the currently searched service IDs one by one, thereby checking if the same service ID exists in the currently searched service IDs (603).

As a result of the checking, if the service ID equal to the extracted service ID exists in the currently searched service IDs (603), the terrestrial DMB receiver terminal maintains the previously stored service ID (604). However, if the service ID equal to the extracted service ID does not exist in the currently searched service IDs (603), the terrestrial DMB receiver terminal checks if service linking information exists (606). The service linking information is for providing information on services having a connection with each broadcasting service. Such service linking information includes soft link information and hard link information in order to indicate the relation among the services. When a broadcasting service includes the same service content, the relation is expressed by the hard link information. When a broadcasting service includes an associated service content, the relation is expressed by the soft link information. Such service linking information is included in the MCI of the FIC and transmitted. Specifically, the service linking information is included in a frame (FIG 0/6) with an extension number 6 of a FIG. type 0 within the MCI, and then transmitted.

If the service linking information exists (606), the terrestrial DMB receiver terminal checks if both the service ID extracted from the service linking information and a hard-linked service ID are included in the list of the searched service IDs (607).

If the service ID and the hard-linked service ID are included in the list of the searched service IDs, the terrestrial DMB receiver terminal updates the service IDs of the imaginary channel list by means of the hard-linked service ID included in the list of the searched service IDs (609).

However, if the service linking information does not exist (606), or if the service ID and the hard-linked service ID are not included in the list of the searched service IDs (607), the terrestrial DMB receiver terminal deletes a corresponding imaginary channel from the imaginary channel list (608).

Then, the processes 602 to 609 are performed for all imaginary channels within the imaginary channel list (605).

When a user has moved to "Busan" after having performed an imaginary channel mapping in order to watch a service "MBC drama" in "Seoul" through an imaginary channel "11" through the processes as described above, the user can watch the same service "MBC drama" through the imaginary channel "11".

That is, when service IDs are identical or a service ID is set to be a hard link through the service linking information, a user can receive the same broadcasting service through the same imaginary channel regardless of inter-area movement.

Figure 7:
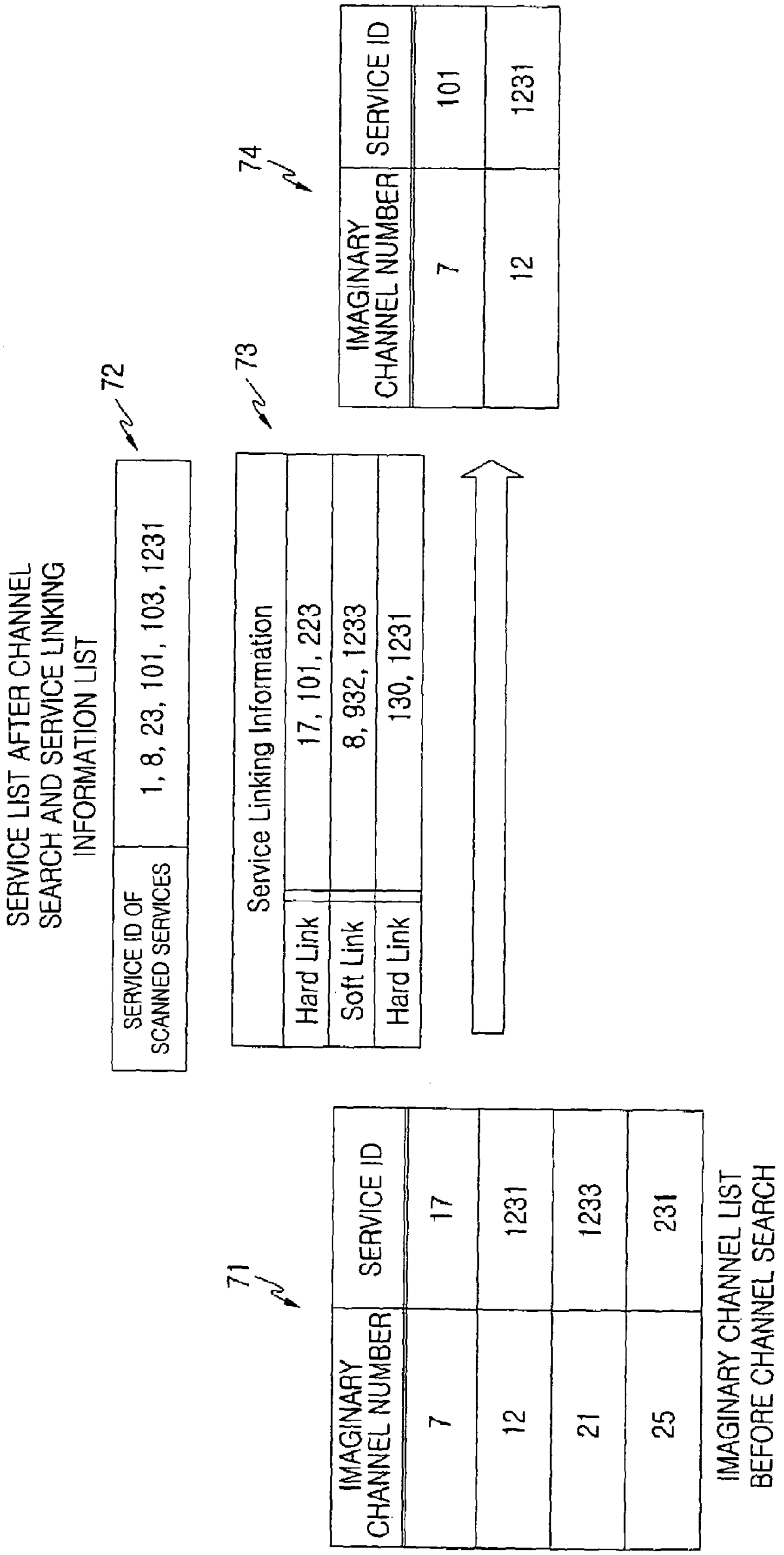
FIG. 7 is a diagram illustrating an imaginary channel updating process using an imaginary channel list update method by a channel search necessitated due to inter-area movement in a terrestrial DMB system according to an embodiment of the present invention.

FIG. 7 is a diagram illustrating an imaginary channel updating process using the imaginary channel list update method by the channel search necessitated due to the inter-area movement in the terrestrial DMB system according to an embodiment of the present invention.

Referring to FIG. 7, first, the imaginary channel mapping table 71 previously stored in the terrestrial DMB receiver terminal is updated by the inter-area movement, etc.

If the terrestrial DMB receiver terminal according to the embodiment of the present invention moves between different areas and newly performs the channel search, the terrestrial DMB receiver terminal receives service IDs 72 of a corresponding area and service linking information 73 through the channel search.

The terrestrial DMB receiver terminal compares the service IDs of the imaginary channel mapping table 71 with the service IDs 72 obtained through the channel search process. As a result of the comparison, if the same service ID exists, the terrestrial DMB receiver terminal maintains a corresponding service ID as is. If the same service ID does not exist, the terrestrial DMB receiver terminal searches for the service linking information and checks if a hard-linked service ID exists. If the hard-linked service ID exists, the terrestrial DMB receiver terminal updates the imaginary channel mapping table 71 with the corresponding service ID. However, if the hard-linked service ID does not exist, the terrestrial DMB receiver terminal deletes a corresponding imaginary channel from the imaginary channel mapping table 71 (74).

The updating process described in FIG. 6 can be applied to each imaginary channel of the imaginary channel mapping table 71 as follows.

First, since the service ID "1231" corresponding to the imaginary channel "12" of the imaginary channel mapping table 71 exists in the newly searched service ID list 72, the service ID "1231" of the imaginary channel "12" is maintained as is (74).

Further, the service ID "17" corresponding to the imaginary channel "7" of the imaginary channel mapping table 71 does not exist in the newly searched service ID list 72. However, since the service linking information 73 includes the hard-linked service IDs "17, 101, 223" and the hard-linked service ID "101" exists in the newly searched service ID list 72, the service ID of the imaginary channel "7" is updated to "101" and stored (74).

Since the service IDs of the imaginary channels "21" and "25" in the imaginary channel mapping table 71 do not exist in the newly searched service ID list 72, and hard links do not exist in the service linking information 73, thus the imaginary channels "21" and "25" are deleted from the imaginary channel mapping table 71 (74).

Figure 8:
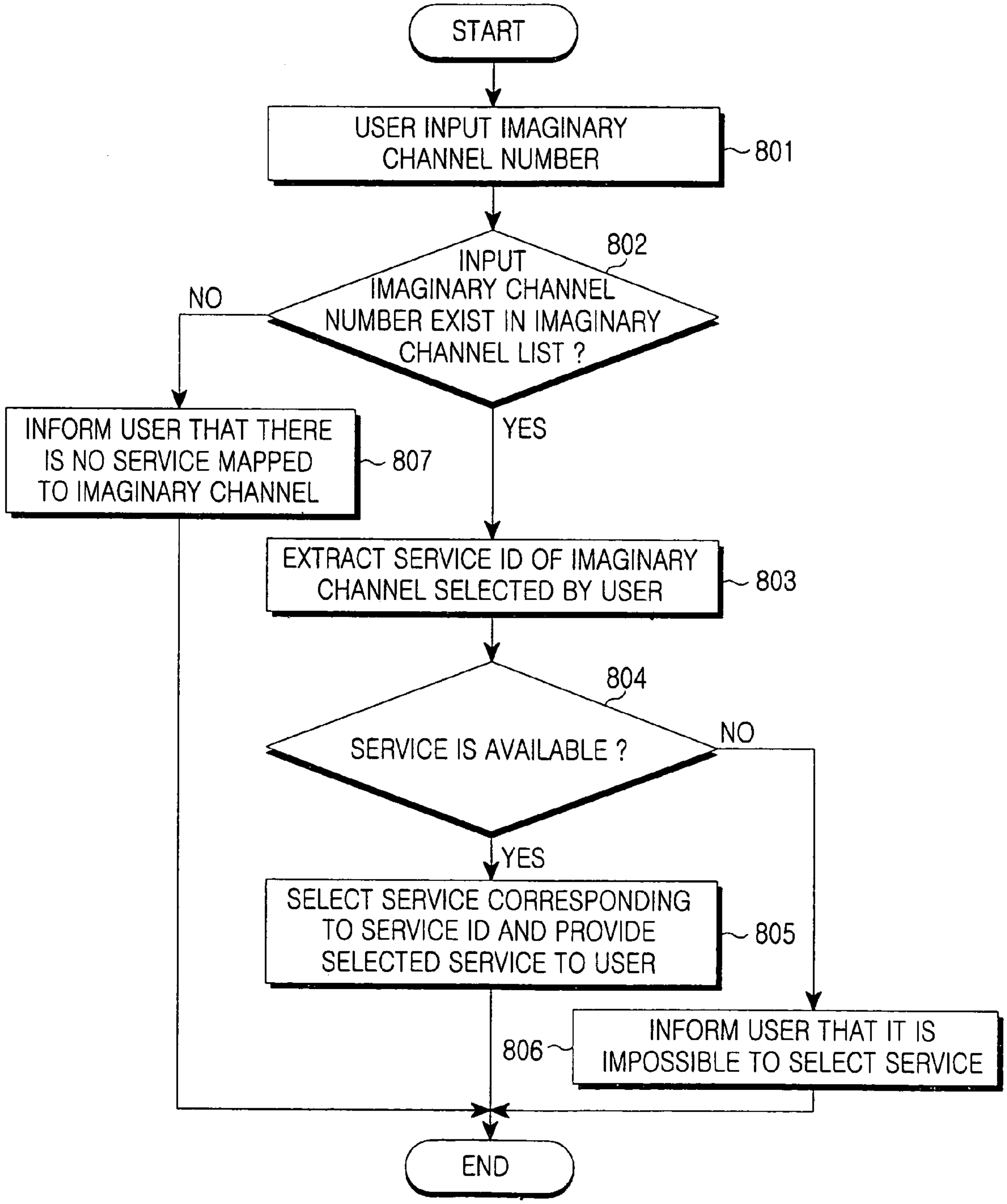
FIG. 8 is a flow diagram illustrating a broadcasting service selection method using an imaginary channel according to an embodiment of the present invention.

FIG. 8 is a flow diagram illustrating a broadcasting service selection method using an imaginary channel according to an embodiment of the present invention.

Referring to FIG. 8, first, if a user inputs an imaginary channel number by means of a number key (801), the terrestrial DMB receiver terminal compares the imaginary channel number input by the user with numbers of an imaginary channel list (e.g. an imaginary channel mapping table) previously stored in the terrestrial DMB receiver terminal, and checks if the input imaginary channel number exists in the corresponding imaginary channel list (802).

If the imaginary channel number exists in the corresponding imaginary channel list, the terrestrial DMB receiver terminal extracts a service ID of the corresponding imaginary channel number (803).

Then, the terrestrial DMB receiver terminal determines if a service corresponding to the extracted service ID is available (804). If the service is available, the terrestrial DMB receiver terminal selects a broadcasting service corresponding to the service ID and provides the selected broadcasting service to the user (805). However, if the service is not available, the terrestrial DMB receiver terminal informs the user that it is not possible to select the corresponding broadcasting service (806).

As a result in step 802, if the imaginary channel number does not exist in the corresponding imaginary channel list, the terrestrial DMB receiver terminal informs the user that there is no service mapped to the imaginary channel (807).

FIG. 9 is a flow diagram illustrating the broadcasting service selection method using the imaginary channel according to an embodiment of the present invention.

Figure 9A:
FIG. 9 is a flow diagram illustrating a broadcasting service selection method using an imaginary channel according to an embodiment of the present invention.
Figure 9B:

Referring to FIG. 9, if a user inputs a specific number "7" while a predetermined broadcasting service is received as illustrated in FIG. 9*a*, the terrestrial DMB receiver terminal finds the input number from the imaginary channel list (e.g. the imaginary channel mapping table), obtains a service ID "101" corresponding to the input number, and then outputs a broadcasting service as illustrated in FIG. 9*b*.

Figure 9C:
Figure 9D:
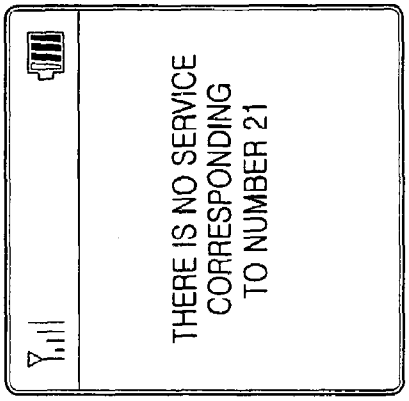

In the meantime, if the user inputs a specific number "21" while a predetermined broadcasting service is received as illustrated in FIG. 9*c*, the terrestrial DMB receiver terminal finds the input number from the imaginary channel list (e.g. the imaginary channel mapping table). However, since there is no corresponding imaginary channel, the terrestrial DMB receiver terminal displays a message "there is no service corresponding to number 21".

In this case, even though the ensemble identification number of a corresponding service is different from the service identification number due to regional difference, an imaginary channel mapping functions independently of the regional difference because the mapping is performed together with regional information.

According to the embodiment of the present invention as described above, an imaginary channel mapping is performed by means of service IDs even though ensemble information is different depending on regions, and the results of the imaginary channel mapping are updated by means of service linking information, etc., depending on regions, so that it is possible to select the same broadcasting service through the same imaginary channel.

According to the present invention as described above, an imaginary channel mapping is performed using fast channel information of terrestrial DMB. Accordingly, even when inter-area movement occurs, a user can directly select a desired service by means of a previously mapped imaginary channel key.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A terrestrial Digital Multimedia Broadcasting (DMB) receiver using an imaginary channel in a terrestrial DMB system, comprising:

- a key input unit for receiving an input from a user;
- a display unit for providing an image output to the user;
- an imaginary channel storage unit for storing information on imaginary channels designated to each broadcasting service by the user;
- a DMB receiving unit for receiving a terrestrial DMB broadcasting;
- a Multiplex Configuration Information (MCI) and Service Information (SI) analyzer for analyzing MCI and SI of Fast Information Channel (FIC) information from the DMB broadcasting signal; and
- a controller for searching the imaginary channel storage unit according to values of number keys input from the key input unit, extracting service IDs, controlling the DMB receiving unit to select broadcasting services according to the extracted service IDs, checking the information analyzed through the MCI/SI analyzer, and performing an update for the imaginary channel storage unit.

2. The terrestrial DMB receiver as claimed in claim 1, wherein, in order to control the update for the imaginary channel storage unit, the controller receives service ID information of a corresponding area and service linking information due to an inter-area movement of the terrestrial DMB receiver through the MCI/SI analyzer.

3. The terrestrial DMB receiver as claimed in claim 2, wherein the service ID information and the service linking information are included in the MCI within the FIC of the terrestrial DMB system.

4. The terrestrial DMB receiver as claimed in claim 3, wherein the service linking information is for providing information on services having connection with each broadcasting service provided by the terrestrial DMB system, and includes a soft link information for indicating an associated service content and a hard link information for indicating an equal service content, in order to indicate a relation among the provided services.

5. A method for updating an imaginary channel according to an inter-area movement in a terrestrial Digital Multimedia Broadcasting (DMB) receiver of a terrestrial DMB system, the method comprising:

- a first step of retrieving, by the terrestrial DMB receiver, information on a broadcasting service of a current area;
- a second step of extracting a service ID for a predetermined imaginary channel from an imaginary channel list previously stored in the terrestrial DMB receiver;
- a third step of checking if the extracted service ID exists in a service ID list of a corresponding area among the information on the broadcasting service;
- a fourth step of, when a service ID equal to the extracted service ID exists, maintaining a previously stored service ID; and
- a fifth step of, when the service ID equal to the extracted service ID does not exist, updating the imaginary channel list based on service linking information in the information on the broadcasting service.

6. The method as claimed in claim 5, wherein the service ID list of the corresponding area and the service linking information are included in Multiplex Configuration Information (MCI) within a Fast Information Channel (FIC) of the terrestrial DMB system, and then are transmitted.

7. The method as claimed in claim 6, wherein the service linking information is for providing information on services having connection with each broadcasting service provided by the terrestrial DMB system, and includes soft link information for indicating an associated service content and hard link information for indicating an equal service content, in order to indicate a relation among the provided services.

8. The method as claimed in claim 5, wherein the fifth step comprises:

- a sixth step of, when the service ID equal to the extracted service ID does not exist, checking if the service linking information exists in the information on the broadcasting service;
- a seventh step of, when the service linking information exists and a hard-linked service ID exists in a list of the searched service IDs, updating the hard-linked service ID to a service ID regarding a corresponding imaginary channel in the imaginary channel list; and
- an eighth step of, when the service linking information does not exist in the sixth step or when the hard-linked service ID does not exist in the service ID list of the corresponding area, deleting the predetermined imaginary channel from the imaginary channel list.

9. The method as claimed in claim 8, further comprising a ninth step of repeating the first step to the eighth step for all imaginary channels in the previously stored imaginary channel list, thereby updating the imaginary channel list.

10. A method for selecting a broadcasting service according to inter-area movement of a terrestrial Digital Multimedia Broadcasting (DMB) receiver in a terrestrial DMB system in which an imaginary channel mapping is performed, the method comprising:

- a first step of receiving an imaginary channel through a predetermined key in the terrestrial DMB receiver in which a mapping for imaginary channel is performed;
- a second step of extracting information on a broadcasting service corresponding to the predetermined key according to whether the predetermined key is included in an imaginary channel list stored in the terrestrial DMB receiver; and a third step of providing the broadcasting service according to whether a service of the extracted information on the broadcasting service is available.

11. The method as claimed in claim 10, further comprising a fourth step of, when the predetermined key is not included in the imaginary channel list in the second step, informing a user that there is no service mapped to a corresponding imaginary channel.

12. The method as claimed in claim 10, wherein the third step comprises:

a fifth step of, when the service of the extracted information on the broadcasting service is available, providing a corresponding broadcasting service to the user; and a sixth step of, when the service of the extracted information on the broadcasting service is not available, informing the user that it is impossible to provide a service according to a corresponding imaginary channel.

13. The method as claimed in claim 12, wherein the information on the broadcasting service corresponding to the predetermined key includes a service ID.

14. The method as claimed in claim 13, wherein the service ID is included in Multiplex Configuration Information (MCI) within a Fast Information Channel (FIC) of the terrestrial DMB system.

* * * * *